United States Patent
Yanagisawa et al.

(10) Patent No.: US 6,563,773 B1
(45) Date of Patent: May 13, 2003

(54) TRACKING CONTROL APPARATUS

(75) Inventors: Takuma Yanagisawa, Tsurugashima (JP); Hiroki Kuribayashi, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 360 days.

(21) Appl. No.: 09/664,409

(22) Filed: Sep. 18, 2000

(30) Foreign Application Priority Data

Sep. 22, 1999 (JP) .......................................... 11-268184

(51) Int. Cl.$^7$ ................................................ G11B 7/00
(52) U.S. Cl. ............... 369/44.41; 369/369; 369/124.12; 369/53.23
(58) Field of Search ...................... 369/44.41, 124.12, 369/53.23, 30.18, 30.27, 32.01, 124.01

(56) References Cited

U.S. PATENT DOCUMENTS

| | | | | |
|---|---|---|---|---|
| 5,442,609 A | * | 8/1995 | Yanagawa | 369/44.28 |
| 5,850,081 A | * | 12/1998 | Yanagisawa | 369/44.41 |
| 6,028,826 A | * | 2/2000 | Yamamoto et al. | 369/44.35 |
| 6,052,344 A | * | 4/2000 | Ueki | 369/44.27 |
| 6,262,955 B1 | * | 7/2001 | Kim | 369/44.41 |
| 6,339,581 B1 | * | 1/2002 | Yoshida et al. | 369/124.14 |

* cited by examiner

*Primary Examiner*—William Korzuch
*Assistant Examiner*—Kim-Kwok Chu
(74) *Attorney, Agent, or Firm*—Sughrue Mion, PLLC

(57) ABSTRACT

A disc has a physical factor changing a shape or a reflection coefficient in a tangential direction of a record track. A tracking control apparatus for the disc is provided with a detecting device having a first detector, a second detector disposed adjacent to the first detector in a radial direction of the disc, a third detector disposed adjacent to the second detector in the tangential direction and a fourth detector disposed adjacent to the first detector in the tangential direction and adjacent to the third detector in the radial direction; a first amplifying device for amplifying output signals of the first and fourth detectors by a first gain; a second amplifying device for amplifying output signals of the second and third detectors by a second gain; a first adding device for calculating a first sum signal, which is a sum of the amplified output signals of the first and fourth detectors; a second adding device for calculating a second sum signal, which is a sum of the amplified output signals of the second and third detectors; and a first subtracting device for calculating a difference between the first an second sum signals and outputting the difference as a tracking error signal. The tracking control apparatus is also provided with an amplitude comparing device for determining the first gain and the second gain on the basis of differences between the output signals.

8 Claims, 8 Drawing Sheets

TRACKING CONTROL APPARATUS

BACKGROUND OF THE INVENTION

1. Field of the Invention

The present invention relates to a tracking servo technique in an optical information recording and/or reproducing apparatus.

2. Description of the Related Art

In an optical information recording and/or reproducing apparatus, a tacking servo is performed so that a light beam used for recording and/or reproducing the information can follow or trace an information track on an optical disc. There are various tracking servo methods. Among them, from a view point of improving a usage efficiency of the light beam emitted from a semiconductor laser, a "one beam tracking method" using only one light beam is advantageous as compared with other methods using a plurality of light beams.

As the one beam tracking method, a so-called (radial) push pull method is well known. The push pull method is a method of detecting a difference between two outputs of two-divided light detector, which is divided in a radial direction of the optical disc (which is referred to as a "radial direction"), as a tracking error signal, to thereby detect a drift of the light beam position with respect to the information track on the optical disc.

However, in the above-mentioned push pull method, there is a problem that a drift or shift is generated in a target value of the tracking servo control due to a shift between the objective lens position of an optical pickup and the optical axis of the light detector (which is referred to as a "lens shift" hereinafter).

In more detail, the optical pickup has such a structure that an actuator is movably mounted on a slider, and that the objective lens is movably mounted on the actuator. Here, if the disc is eccentric or if the slider does not smoothly move in the radial direction, the actuator performs a fine adjustment of tracking by shifting only the objective lens.

In case that the actuator moves the objective lens in this way, the relative position of the objective lens with respect to the optical axis of the light detector (i.e., the division line of the two-divided light detector) also moves. As a result, the light spot position with respect to the light detector is changed, so that the drift is generated in the target value of the tracking servo.

This phenomenon is explained with referring to FIG. 8. In case that there is no lens shift, the value of the tracking error signal becomes "0" under a condition that the light spot is positioned on a central line of the information track. Therefore, the target value of the tracking servo becomes an original point O. However, if there is the lens shift, since the tracking error signal includes an offset component due to the lens shift, the target value of the tracking servo becomes a point Os shown in FIG. 8, so that the drift of the target value is generated. This phenomenon is the more significantly observed as the track pitch of the optical disc is the narrow.

SUMMARY OF THE INVENTION

It is therefore an object of the present invention to provide a tracking control apparatus, which can reduce an influence of the lens shift, by using the one beam tracking method.

The above object of the present invention can be achieved by a first tracking control apparatus for a disc having a physical factor changing a shape or a reflection coefficient in a tangential direction of a record track of the disc. The first tracking control apparatus is provided with: a detecting device having a first detector, a second detector disposed adjacent to the first detector in a radial direction of the disc, a third detector disposed adjacent to the second detector in the tangential direction and a fourth detector disposed adjacent to the first detector in the tangential direction and adjacent to the third detector in the radial direction; a first amplifying device for amplifying an output signal of the first detector and an output signal of the fourth detector by a first gain; a second amplifying device for amplifying an output signal of the second detector and an output signal of the third detector by a second gain; a first adding device for calculating a first sum signal, which is a sum of the amplified output signal of the first detector and the amplified output signal of the fourth detector; a second adding device for calculating a second sum signal, which is a sum of the amplified output signal of the second detector and the amplified output signal of the third detector; a first subtracting device for calculating a difference between the first sum signal and the second sum signal and outputting the difference as a tracking error signal; a second subtracting device for calculating a first difference signal, which is a difference between the output signal of the first detector and the output signal of the fourth detector; a third subtracting device for calculating a second difference signal, which is a difference between the output signal of the second detector and the output signal of the third detector; and an amplitude comparing device for comparing amplitudes of the first difference signal and the second difference signal with each other, and determining the first gain and the second gain on the basis of a result of comparison.

According to the first tracking control apparatus of the present invention, the tracking error signal is generated by calculating the difference between the first sum signal, which is the sum of the output signals of the first and fourth detectors, and the second sum signal, which is the sum of the output signals of the second and third detectors. By comparing the amplitudes of the first difference signal, which is the difference between the output signals of the first and fourth detectors, and the second difference signal, which is the difference between the output signals of the second and third detectors, and, on the basis of the result of the comparison, the first gain for the first sum signal and the gain for the second sum signal are determined. Here, since the difference between the amplitude of the first difference signal and the amplitude of the second difference signal indicates the lens shift component, it is possible to obtain the tracking error signal, in which the influence of the lens shift is removed, by adjusting the gains for the first and second sum signals on the basis of this difference indicating the lens shift component.

The above object of the present invention can be also achieved by a second tracking control apparatus for a disc having a physical factor changing a shape or a reflection coefficient in a tangential direction of a record track of the disc. The second tracking control apparatus is provided with: a detecting device having a first detector, a second detector disposed adjacent to the first detector in a radial direction of the disc, a third detector disposed adjacent to the second detector in the tangential direction and a fourth detector disposed adjacent to the first detector in the tangential direction and adjacent to the third detector in the radial direction; a first amplifying device for amplifying a first sum signal, which is a sum of an output signal of the first detector and an output signal of the fourth detector, by a first gain; a second amplifying device for amplifying a second sum signal, which is a sum of an output signal of the second detector and an output signal of the third detector, by a second gain; a first subtracting device for calculating a difference between the first sum signal and the second sum signal and outputting the difference as a tracking error signal; a second subtracting device for calculating a first difference signal, which is a difference between the output signal of the first detector and the output signal of the fourth detector; a third subtracting device for calculating a second difference signal, which is a difference between the output signal of the second detector and the output signal of the third detector; and an amplitude comparing device for comparing amplitudes of the first difference signal and the second difference signal with each other, and determining the first gain and the second gain on the basis of a result of comparison.

According to the second tracking control apparatus of the present invention, the tracking error signal is generated by calculating the difference between the first sum signal, which is the sum of the output signals of the first and fourth detectors, and the second sum signal, which is the sum of the output signals of the second and third detectors. By comparing the amplitudes of the first difference signal, which is the difference between the output signals of the first and fourth detectors, and the second difference signal, which is the difference between the output signals of the second and third detectors, and, on the basis of the result of the comparison, the first gain for the first sum signal and the gain for the second sum signal are determined. Here, since the difference between the amplitude of the first difference signal and the amplitude of the second difference signal indicates the lens shift component, it is possible to obtain the tracking error signal, in which the influence of the lens shift is removed, by adjusting the gains for the first and second sum signals on the basis of this difference indicating the lens shift component.

In one aspect of the first or second tracking control apparatus of the present invention, the amplitude comparing device determines the first gain and the second gain so as to make the amplitude of the first difference signal and the amplitude of the second difference signal equal to each other.

According to this aspect, it is possible to remove the lens shift component in the tracking error signal, by this determining process of the amplitude comparing device.

In another aspect of the first or second tracking control apparatus of the present invention, the apparatus is further provided with: a first holding device for holding the first difference signal and supplying the held first difference signal to the amplitude comparing device; and a second holding device for holding the second difference signal and supplying the held second difference signal to the amplitude comparing device.

According to this aspect, it is possible to continuously monitor the amplitudes of the first and second difference signals.

In another aspect of the first or second tracking control apparatus of the present invention, the apparatus is further provided with a driving device for moving a light beam in the radial direction on the disc on the basis of the tracking error signal.

According to this aspect, it is possible to perform an accurate tracking control, which is not influenced by the lens shift.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Figure 1:
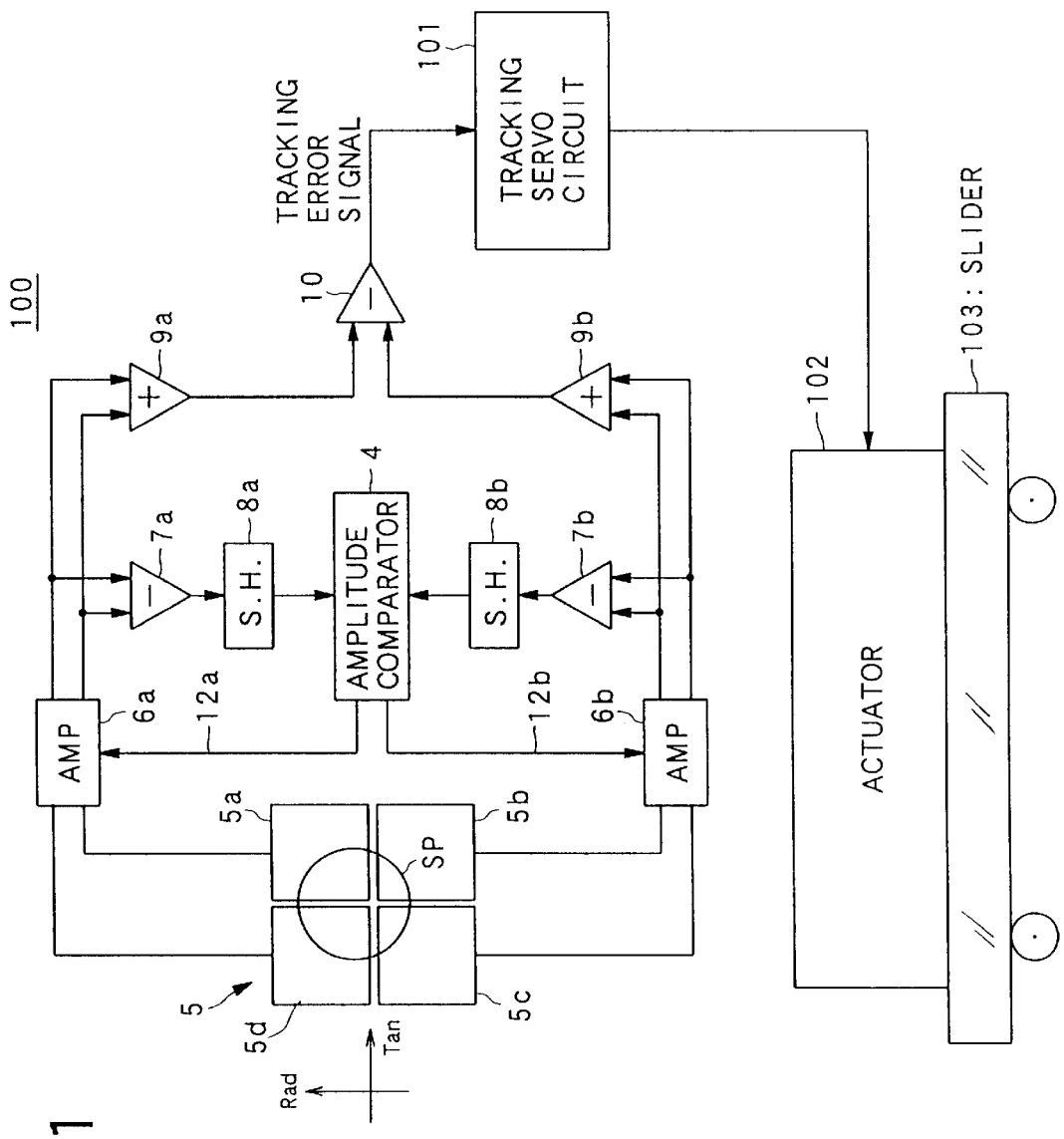
FIG. 1 is a block diagram showing a tracking control circuit as one embodiment of the present invention.

The present invention is adapted to detect a lens shift amount by obtaining a tangential push pull signal by using a four divided light detector and then correct a tracking error signal so as to cancel the drift or offset of the target value of the tracking servo due to the lens shift, on the basis of the detected lens shift amount.

At first, the tangential push pull signal is explained. The tangential push pull signal is a signal obtained on an optical disc which has a portion where a shape or reflection coefficient changes in a tangential direction. By a four divided light detector 5 shown in FIGS. 2B and 2C, a first tangential push pull signal TP1 and a second tangential push pull signal TP2 can be obtained respectively as follows.

TP1=(output signal of a detector 5a)−(output signal of a detector 5d)

TP2=(output signal of a detector 5b)−(output signal of a detector 5c)

By inverting the order of adding and subtracting, the first tangential push pull signal TP1 and the second tangential push pull signal TP2 may be obtained respectively as follows.

TP1=(output signal of the detector 5d)−(output signal of the detector 5a)

TP2=(output signal of the detector 5c)−(output signal of the detector 5b)

Figure 2A:
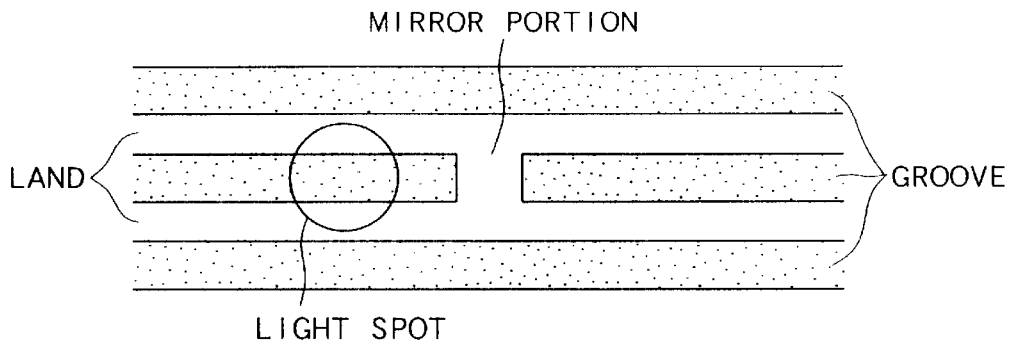
FIG. 2A is a schematic plan view of land and groove tracks on an optical disc with a reproduction beam spot for explaining a tangential push pull signal in the embodiment.
Figure 2B:
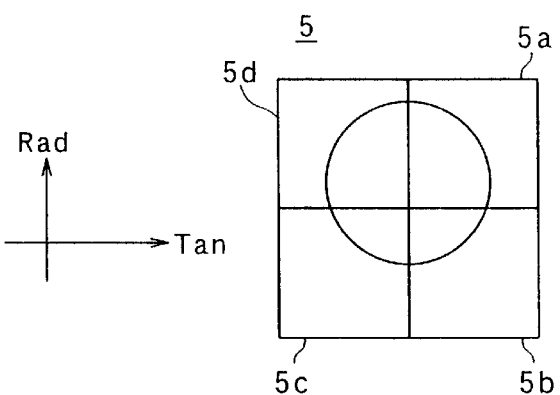
FIG. 2B is a front view of a four divided light detector in one state, which obtains the tangential push pull signal in the embodiment.
Figure 2C:
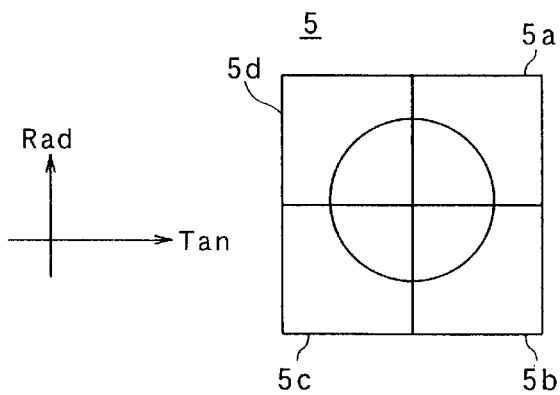
FIG. 2C is a front view of the four divided light detector in another state, which obtains the tangential push pull signal in the embodiment.
Figure 3A:
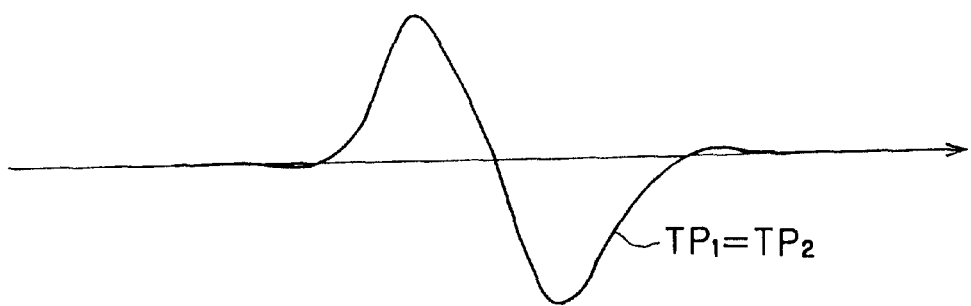
FIG. 3A is a graph showing one example of a waveform of the tangential push pull signal in the embodiment.
Figure 3B:
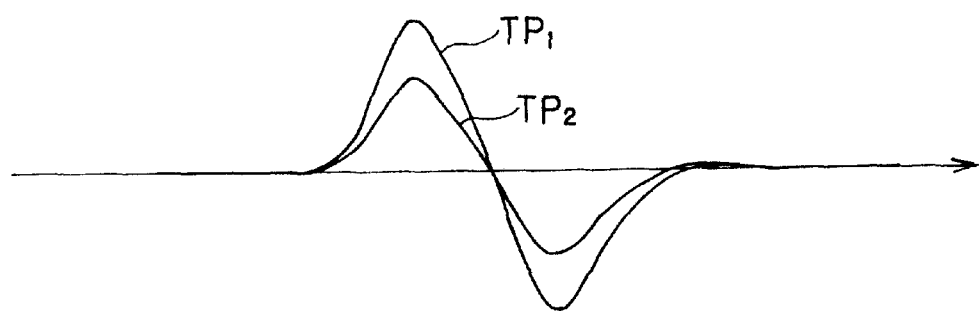
FIG. 3B is a graph showing another example of the waveform of the tangential push pull signal in the embodiment.

The value of the tangential push pull signal becomes "0", at a portion where the shape or reflection coefficient does not change in the tangential direction on the optical disc. However, when the light spot passes through a portion where the shape or reflection coefficient changes in the tangential direction, the value of the tangential push pull signal becomes a value other than "0" depending upon the shape or reflection coefficient. For example, as shown in FIG. 2A, in an optical disc having a mirror portion at one portion of a groove track, when the light spot passes through this mirror portion, the tangential push pull signals TP1 and TP2 exhibit the waveforms as shown in FIGS. 3A and 3B. Here, if there is no lens shift for the light spot as shown in FIG. 2C, the amplitude of the tangential push pull signals TP1 and TP2 are equal to each other as shown in FIG. 3A. On the other hand, if the center of the light spot is shifted from the center of the four divided detector 5 due to the lens shift as shown in FIG. 2B, difference between the amplitudes of the tangential push pull signals TP1 and TP2 is generated as shown in FIG. 3B. The respective amplitudes of the tangential push pull signals TP1 and TP2 change approximately in proportional to the lens shift amount.

Therefore, by monitoring those two tangential push pull signals TP1 and TP2, it is judged that there is no lens shift if the monitored amplitudes of those two are equal to each other, while it is judged that there is the lens shift if the monitored amplitudes of those two are different from each other. Further, by checking which amplitude is the greater between those two, it is possible to recognize the direction of the lens shift. Thus, as controlling the gain of the detection signal in the detector 5 so that the amplitudes of those two tangential push pull signals are equal to each other, it is possible to remove the influence of the lens shift in the tracking error signal.

More concretely, with referring to the detector 5 shown in FIG. 2B, the tracking error signal TE is obtained as following.

TE=α×(output of the detector 5a+output of detector 5d)−β×(output of the detector 5b+output of detector 5c)

wherein α and β represent the gains of the amplifiers for amplifying the outputs of the detectors respectively. Those gains α and β are determined so as to satisfy a following equation by using the tangential push pull signals TP1 and TP2.

α×TP1=β×TP2

By this, it is possible to remove the drift or offset component in the tracking error signal due to the lens shift.

The tangential push pull signal can be obtained by using a pit (e.g., a synchronization pattern) which exists at a certain cycle in case of the optical disc exclusive for reproduction. In case of an optical disc capable of recording, the tangential push pull signal can be obtained by using the mirror portion provided on the groove track in advance. The types of the optical discs from which the tangential push pull signal can be obtained in the present embodiment will be described later.

Next, the embodiments of the present invention will be now explained with referring to the drawings.

FIG. 1 shows a structure of a tracking control circuit of one embodiment of the present invention. In FIG. 1, a tracking control circuit 100 has a four divided detector 5. The four divided detector 5 has four detectors 5a to 5d, on which a light spot SP is formed as the light beam reflected from the optical disc is irradiated thereonto.

The outputs of the detectors 5a and 5d are inputted to an amplifier 6a, while the outputs of the detectors 5b and 5c are inputted to an amplifier 6b. The amplifier 6a amplifies the outputs of the detectors 5a and 5d by a gain (α) corresponding to a gain control signal 12a while the amplifier 6b amplifies the outputs of the detectors 5b and 5c by a gain (β) corresponding to a gain control signal 12b. The output signals of the amplifier 6a are inputted to a subtracter 7a and an adder 9a while the output signals of the amplifier 6b are inputted to a subtracter 7b and an adder 9b. The adder 9a generates a sum signal of the output signals of the detectors 5a and 5d while the adder 9b generates a sum signal of the output signals of the detectors 5b and 5c. A subtracter 10 generates a difference between those sum signals and outputs it as a tracking error signal.

This tracking error signal is transmitted to a tracking servo circuit 101, which controls an actuator 102 for actuating an optical pickup, by sending a servo control signal to the actuator 102. In the optical pickup, the actuator 102 is movably mounted on a slider 103, and that the objective lens (not illustrated) is movably mounted on the actuator 102. Here, if the disc is eccentric or if the slider does not smoothly move in the radial direction, the actuator 102 performs a fine adjustment of tracking by shifting only the objective lens, under the control of the tracking servo circuit 101. The objective lens and the four divided detector 5 as well as a light source (e.g., a semiconductor laser) etc., are mounted in the optical pickup. All the constitutional elements of the tracking control circuit 100 shown in FIG. 1 may be equipped in the optical pickup. Alternatively, the tracking control circuit 100 may be partially equipped in the optical pickup (e.g., only the four divided detector 5 may be equipped, or only the four divided detector 5 and the amplifiers 6a and 6b may be equipped in the optical pickup while other constitutional elements are equipped in a processing circuit in the information recording and/or reproducing apparatus).

On the other hand, the subtracter 7a generates a difference between the outputs signals of the detectors 5a and 5d, and supplies it as a tangential push pull signal TP1 to a sample hold circuit 8a. In the same manner, the subtracter 7b generates a difference between the outputs signals of the detectors 5b and 5c, and supplies it as a tangential push pull signal TP2 to a sample hold circuit 8b. The sample hold circuits 8a and 8b hold continuously the tangential push pull signals TP1 and TP2 respectively and send them to an amplitude comparator 4. The amplitude comparator 4 determines the gains α and β respectively for the amplifiers 6a and 6b so as to make the values of the tangential push pull signals TP1 and TP2 equal to each other, and supply them as the gain control signals 12a and 12b respectively to the amplifier 6a and 6b.

By those, the drift or offset component in the tracking error signal due to the lens shift is removed. As a result, the subtracter 10 outputs the tracking error signal which is not influenced by the lens shift.

Incidentally, in the above explained example, the tangential push pull signals are continuously held. Instead, in case that the position where the tangential push pull signal can be obtained (e.g., the mirror portion in the above explained example) or the cycle when the tangential push pull signal appears is known, it is possible to predict the timing of the tangential push pull signal and supply the tangential push pull signal to the amplitude comparator 4 only at the predicted timing when the tangential push pull signal is supposed to be obtained.

Also, in the circuit shown in FIG. 1, one amplitude 6a is used as a first amplifying device, to which the output signals of the detectors 5a and 5d are inputted. Instead, as the first amplifying device, one amplifier for amplifying the output signal of the detector 5a and another amplifier for amplifying the output of the detector 5d may be provided, such that the gains of those two amplifiers are equally set to the first gain (α). The same thing can be said for the relationship between the amplifier 6b functioning as the second amplifying device and the detectors 5b and 5c.

Figure 4:
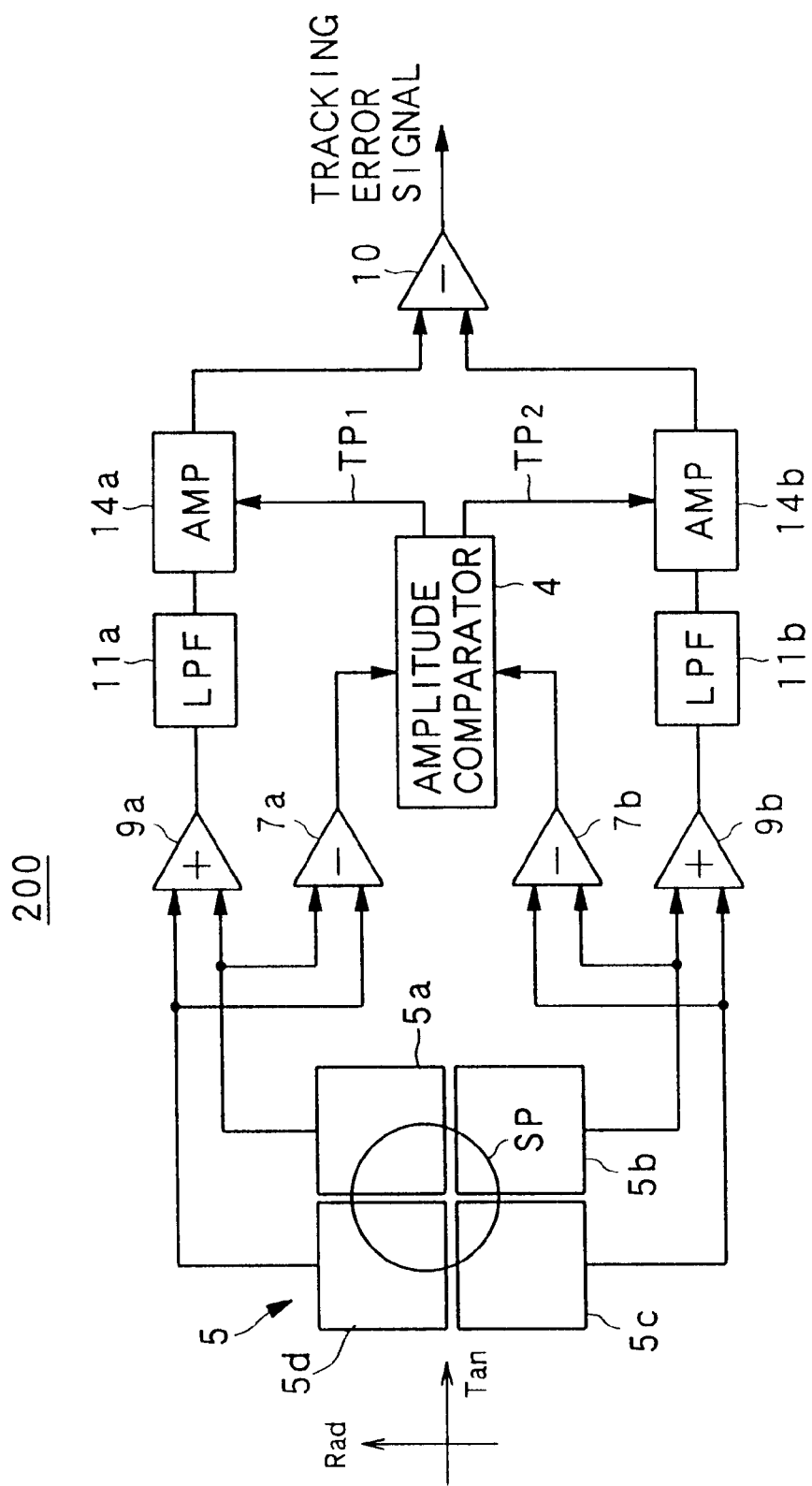
FIG. 4 is a block diagram showing a tracking control circuit as another embodiment of the present invention.

FIG. 4 shows a structure of a tracking control circuit of another embodiment of the present invention. Although the operating process executed by the circuit shown in FIG. 4 is basically equivalent to that executed by the circuit shown in FIG. 1, the detailed circuit structure of those are different from each other. In FIG. 4, the same constitutional elements as those in FIG. 1 carry the same reference numerals and the explanations thereof are omitted.

In the circuit shown in FIG. 4, a tracking control circuit 200 is constructed as follows. Namely, amplifiers 14a and 14b are disposed at a previous stage of the subtracter 10, and low pass filters 11a and 11b are inserted at previous stages of the amplifiers 14a and 14b respectively. Those low pass filters 11a and 11b are filters to extract only the tracking error signal components, and which may be added to the circuit shown in FIG. 1.

Figure 5A:
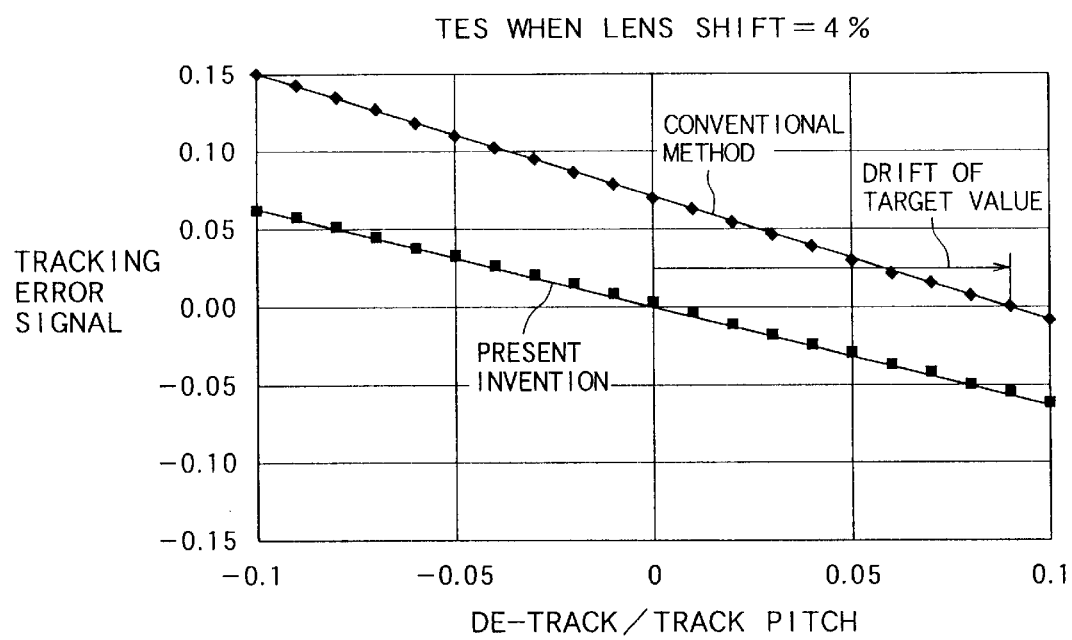
FIG. 5A is one diagram showing a comparison result of the drifts of target values of tracking error signals in the present embodiment and the conventional push pull method.
Figure 5B:
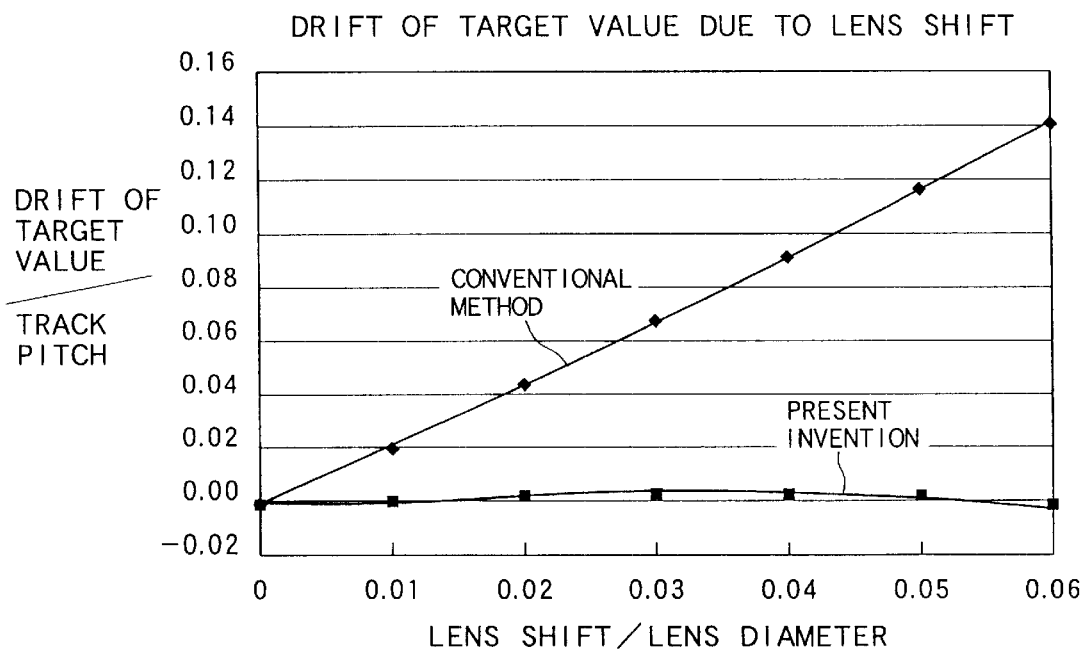
FIG. 5B is another diagram showing a comparison result of the drifts of target values of tracking error signals in the present embodiment and the conventional push pull method.

FIGS. 5A and 5B show a comparison result between the present embodiment and the conventional push pull method. The conditions are assumed here as follows.

light beam wavelength λ=410 nm
track pitch=0.4 μm
groove width=0.2 μm
groove depth=λ/8

It is also assumed that a short mirror portion is disposed on the groove track (as shown in FIG. 2A).

FIG. 5A shows a waveform of the tracking error signal in case that there is a lens shift of 4%. According to the conventional push pull method, a point where the value of the tracking error signal becomes "0" is shifted from the track center, while this point coincides with the track center according to the present embodiment.

FIG. 5B shows the drift or offset amount of the target value of the tracking servo due to the lens shift. According to the conventional push pull method, the drift or offset amount of the target value increases in proportional to the increase of the lens shift, while the drift or offset of the target value is substantially kept to be "0" regardless of the increase of the lens shift according to the present embodiment.

Next, the optical disc to which the tracking control apparatus of the present embodiment can be applied is explained. As aforementioned, the tangential push pull signal appears at a portion where the shape or reflection coefficient changes in the tangential direction of the disc, and at other portions, it becomes "0" value. Therefore, the present embodiment can be applied to an optical disc which has such a physical characteristic that the shape or reflection coefficient changes in the tangential direction of the disc.

From this point of view, examples of the optical discs are shown in FIG. 6A to FIG. 7D, to which the present invention can be applied.

Figure 6A:
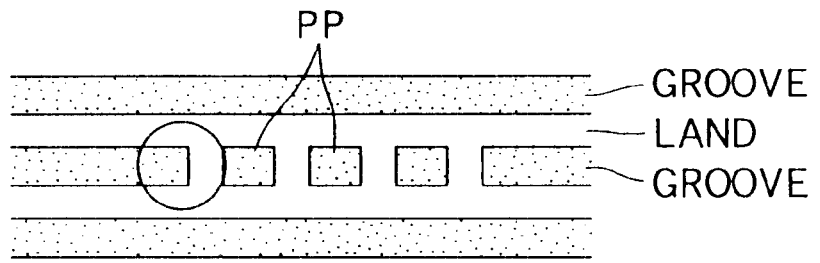
FIG. 6A is a schematic plan view of one example of the land and groove track structure on the optical disc, to which the tracking control apparatus of the present embodiment can be applied.
Figure 6B:
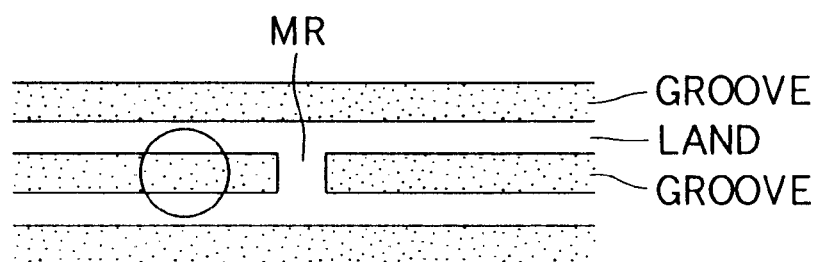
FIG. 6B is a schematic plan view of another example of the land and groove track structure on the optical disc, to which the tracking control apparatus of the present embodiment can be applied.
Figure 6C:
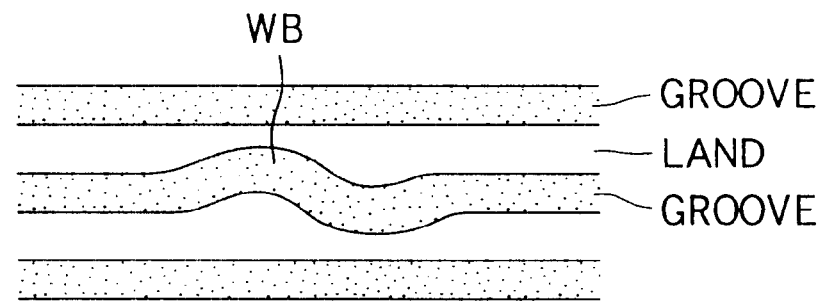
FIG. 6C is a schematic plan view of another example of the land and groove track structure on the optical disc, to which the tracking control apparatus of the present embodiment can be applied.

FIG. 6A shows an optical disc, on which a pre-pit PP is formed on the groove track for the purpose of an address detection. FIG. 6B shows an optical disc on which a mirror portion MR is disposed on the groove track as a record track. FIG. 6C shows an optical disc on which the groove track is wobbled such that wobbling portion WB may be partial or continuous.

Figure 7A:
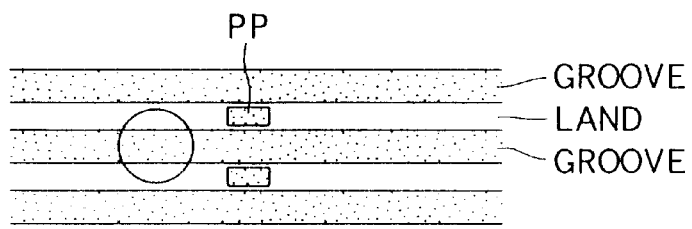
FIG. 7A is a schematic plan view of another example of the land and groove track structure on the optical disc, to which the tracking control apparatus of the present embodiment can be applied.
Figure 7B:
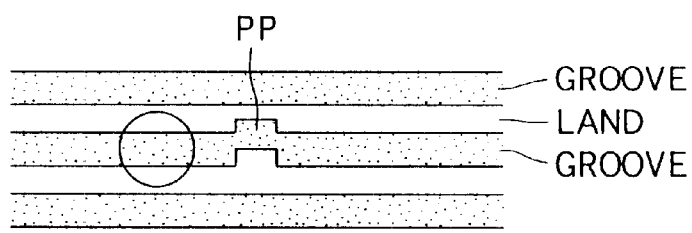
FIG. 7B is a schematic plan view of another example of the land and groove track structure on the optical disc, to which the tracking control apparatus of the present embodiment can be applied.
Figure 7C:
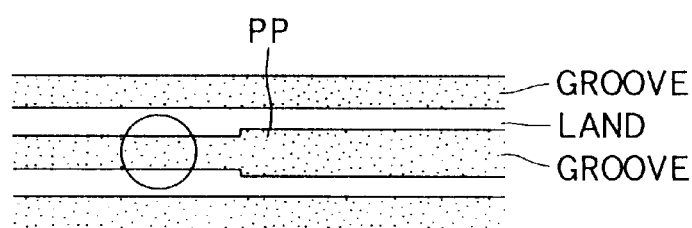
FIG. 7C is a schematic plan view of another example of the land and groove track structure on the optical disc, to which the tracking control apparatus of the present embodiment can be applied.
Figure 7D:
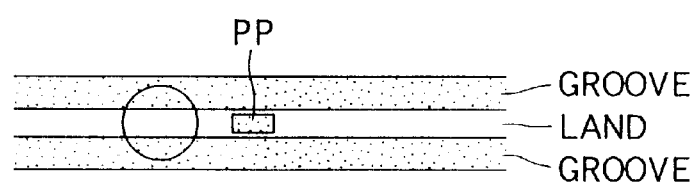
FIG. 7D is a schematic plan view of another example of the land and groove track structure on the optical disc, to which the tracking control apparatus of the present embodiment can be applied.
Figure 8:
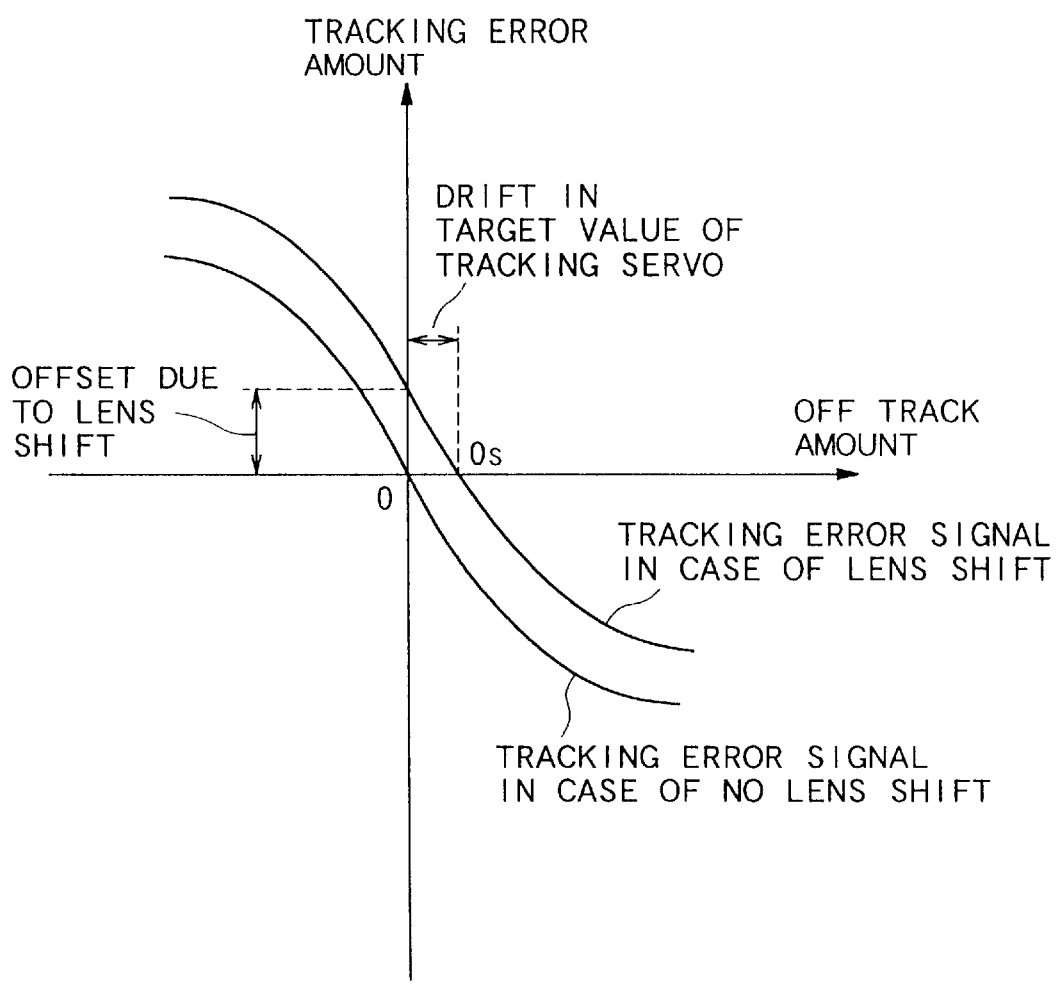
FIG. 8 is a graph showing a problem in the conventional push pull method.

Each of FIG. 7A to FIG. 7D shows an optical disc on which a pre-pit PP is formed on a land track. Among those, FIG. 7C shows an example that the pre-pit PP on the land track contacts with the groove track and that the length of the pre-pit PP is certainly long. FIG. 7D shows an example that information is recorded on the land track.

Those examples shown in FIG. 6A to FIG. 7D are just examples, and the present invention can be applied to other types of optical discs as long as they have the aforementioned physical characteristic.

The tracking control apparatus of the present invention as described above in detail can be applied to an information recording apparatus, an information reproducing apparatus and an information recording and reproducing apparatus for an optical disc.

As described above in detail, according to the present invention, the lens shift amount is detected by monitoring the tangential push pull signal, and the gains of the tracking error signal are controlled so as to remove the influence of the lens shift. Thus, even in case that the lens shift certainly exists, it is possible to prevent the target value of the tracking servo from being drifted or shifted, and thereby it is possible to realize a reliable tracking control suitable for the disc especially having a narrow pitch.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-268184 filed on Sep. 22, 1999 including the specification, claims, drawings and summary is incorporated herein by reference in its entirety.

What is claimed is:

1. A tracking control apparatus for a disc having a physical factor changing a shape or a reflection coefficient in a tangential direction of a record track of said disc, comprising:

a detecting device having a first detector, a second detector disposed adjacent to said first detector in a radial direction of said disc, a third detector disposed adjacent to said second detector in the tangential direction and a fourth detector disposed adjacent to said first detector in the tangential direction and adjacent to said third detector in the radial direction;

a first amplifying device for amplifying an output signal of said first detector and an output signal of said fourth detector by a first gain;

a second amplifying device for amplifying an output signal of said second detector and an output signal of said third detector by a second gain;

a first adding device for calculating a first sum signal, which is a sum of the amplified output signal of said first detector and the amplified output signal of said fourth detector;

a second adding device for calculating a second sum signal, which is a sum of the amplified output signal of said second detector and the amplified output signal of said third detector;

a first subtracting device for calculating a difference between the first sum signal and the second sum signal and outputting the difference as a tracking error signal;

a second subtracting device for calculating a first difference signal, which is a difference between the output signal of said first detector and the output signal of said fourth detector;

a third subtracting device for calculating a second difference signal, which is a difference between the output signal of said second detector and the output signal of said third detector; and an amplitude comparing device for comparing amplitudes of the first difference signal and the second difference signal with each other, and determining the first gain and the second gain on the basis of a result of comparison.

2. A tracking control apparatus according to claim 1, wherein said amplitude comparing device determines the first gain and the second gain so as to make the amplitude of the first difference signal and the amplitude of the second difference signal equal to each other.

3. A tracking control apparatus according to claim 1, further comprising:

a first holding device for holding the first difference signal and supplying the held first difference signal to said amplitude comparing device; and a second holding device for holding the second difference signal and supplying the held second difference signal to said amplitude comparing device.

4. A tracking control apparatus according to claim 1, further comprising a driving device for moving a light beam in the radial direction on said disc on the basis of the tracking error signal.

5. A tracking control apparatus for a disc having a physical factor changing a shape or a reflection coefficient in a tangential direction of a record track of said disc, comprising:

a detecting device having a first detector, a second detector disposed adjacent to said first detector in a radial direction of said disc, a third detector disposed adjacent to said second detector in the tangential direction and a fourth detector disposed adjacent to said first detector in the tangential direction and adjacent to said third detector in the radial direction;

a first amplifying device for amplifying a first sum signal, which is a sum of an output signal of said first detector and an output signal of said fourth detector, by a first gain;

a second amplifying device for amplifying a second sum signal, which is a sum of an output signal of said second detector and an output signal of said third detector, by a second gain;

a first subtracting device for calculating a difference between the first sum signal and the second sum signal and outputting the difference as a tracking error signal;

a second subtracting device for calculating a first difference signal, which is a difference between the output signal of said first detector and the output signal of said fourth detector;

a third subtracting device for calculating a second difference signal, which is a difference between the output signal of said second detector and the output signal of said third detector; and an amplitude comparing device for comparing amplitudes of the first difference signal and the second difference signal with each other, and determining the first gain and the second gain on the basis of a result of comparison.

6. A tracking control apparatus according to claim 5, wherein said amplitude comparing device determines the first gain and the second gain so as to make the amplitude of the first difference signal and the amplitude of the second difference signal equal to each other.

7. A tracking control apparatus according to claim 5, further comprising:

a first holding device for holding the first difference signal and supplying the held first difference signal to said amplitude comparing device; and a second holding device for holding the second difference signal and supplying the held second difference signal to said amplitude comparing device.

8. A tracking control apparatus according to claim 5, further comprising a driving device for moving a light beam in the radial direction on said disc on the basis of the tracking error signal.

* * * * *